P. H. THOMAS.
SYSTEM OF DISTRIBUTION BY VAPOR ELECTRIC CONVERTERS.
APPLICATION FILED JUNE 14, 1907.
1,110,593.
Patented Sept. 15, 1914.
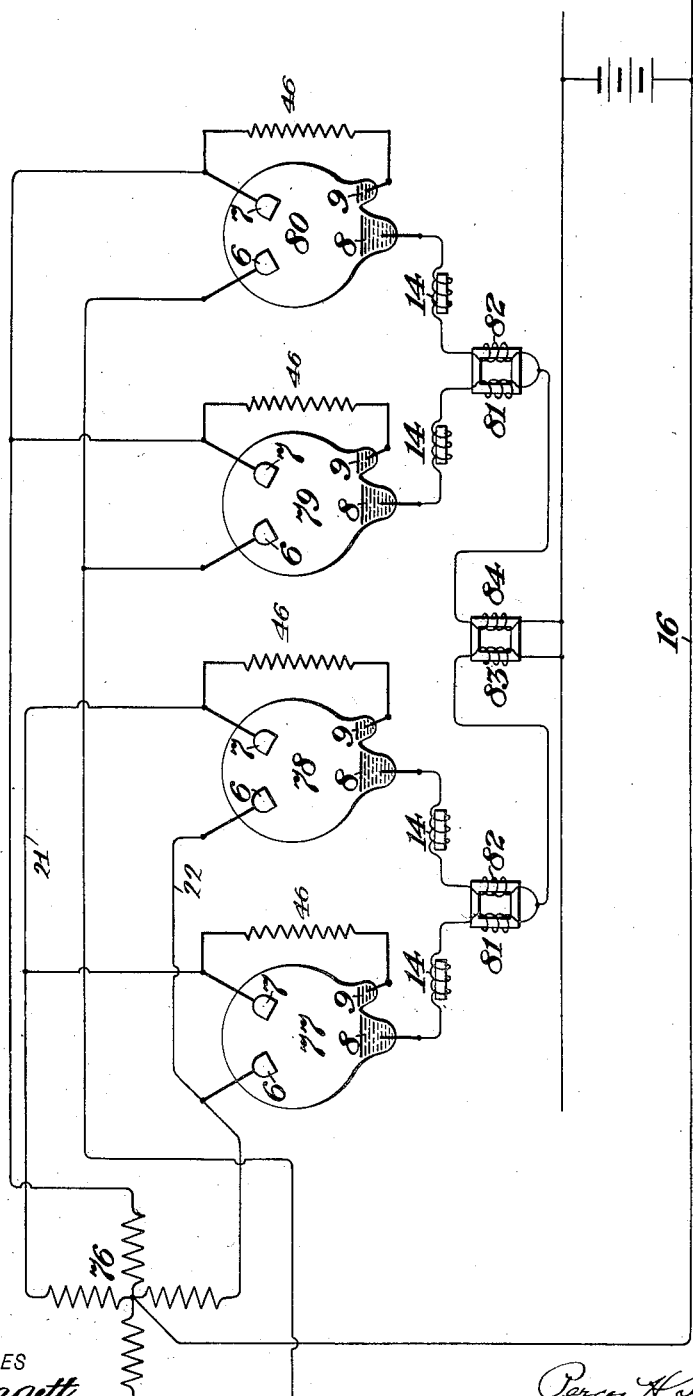
WITNESSES
INVENTOR
Percy H. Thomas
BY
ATTORNEY

UNITED STATES PATENT OFFICE.

PERCY H. THOMAS, OF MONTCLAIR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

SYSTEM OF DISTRIBUTION BY VAPOR ELECTRIC CONVERTERS.

1,110,593. Specification of Letters Patent. Patented Sept. 15, 1914.

Original application filed June 22, 1905, Serial No. 266,375. Divided and this application filed June 14, 1907. Serial No. 378,897.

*To all whom it may concern:*

Be it known that I, PERCY H. THOMAS, a citizen of the United States, and resident of Montclair, county of Essex, State of New Jersey, have invented certain new and useful Improvements in Systems of Distribution by Vapor Electric Converters, of which the following is a specification.

The present application is a division of applicant's case Serial Number 266,375, filed June 22nd, 1905.

My invention relates to means for starting and operating a plurality of rectifiers in parallel on the same supply and feeding the same receiving mains. Mercury vapor devices, in virtue of the fact that they have a falling voltage characteristic, require a series resistance or similar voltage absorbing device in each of the branches of a parallel path in which they may be connected to secure parallel operation. But there also exists a particular difficulty in starting one such mercury vapor rectifier when connected directly in parallel with another such device. This difficulty, not found when running rectifiers singly, results from the fact that when the rectifier to be started is connected to the leads of the operating rectifier it, by this act, has impressed upon its electrodes only the operating voltage of a running rectifier and no higher voltage is available for starting purposes. If this operating voltage on the running rectifier is not sufficient to start the non-operating rectifier the initiation of current flow is not secured. It is the object of the present invention to prevent such a condition. Generally speaking the means I use consists both in the locating of voltage absorbing means in the branches of the parallel portion of the circuit and also of transformer coils in these branches magnetically related in such a way that a relative excess of current in one branch produces a positive electro-motive force in the other branch. The operation of these devices will be explained more particularly in connection with the drawing.

In the drawings are shown four rectifiers operating in pairs on two of the phases of a polyphase supply and provided with means for starting one rectifier into operation in parallel with the previously operating rectifier.

To describe the drawings more in detail, 76 is a multiphase generator having its neutral point connected to the conductor 16 and connected by its terminals to the four converters 77, 78, 79 and 80.

6 and 7 are the positive electrodes of the several rectifiers and 8 their negative electrodes, while electrodes 9 are starting electrodes. Any of the well known means for starting may be used with these rectifiers, but I have shown a supplemental electrode, 9, contacting with the main cathode, 8, and connected by a resistance, 46, with the lead of the anode, 7. The pairs of coils 81, 82; 83, 84; are wound each pair upon a common core in such a way that current flowing in one coil tends to produce a flow of current in the companion coil in such a way as to equalize the current flow in the circuits of the two coils of the pair. The coils 81 and 82 may serve to supply potential for transferring starting current from the starting electrode 9 of any rectifier of a pair to the main electrodes 6 and 7, in virtue of the electro motive force generated in such a coil by the current in its operating companion rectifier. This production of electro motive force in one circuit from current in its companion circuit results from the winding of the coils 81 and 82 upon a common magnetic core. The coils, 14, 14, are used to keep the converter alive. The converters 77 and 78 are connected to one phase of the generator 76, and 79 and 80 to another phase of the generator 76. To insure the starting of converters connected with both phases of the generator the current from the converters in one phase is led through the coil 83 and from the other phase through the coil 84, which coils are wound on the same core in such a way as to accomplish the same result as the coils 81 and 82.

The operation of the system is clear from what has already been said, but may be summarized as follows: Each converter is able to operate alone, as for example, in virtue of its inductance 14, or all may operate together in virtue of the various voltage absorbing devices in series. Each converter even after the breaking down of its negative electrode starting reluctance has still an initial resistance to the transfer of current from the starting to the operating electrodes. In starting the first converter, any of the various well known starting means can be utilized. When, however, one or more converters fed from the same mains are already operating, this necessary transfer or operating voltage may be produced by the current flow in the already operating converter or converters. The normal pulsating current will produce pulsating magnetism in one or more of the cores of the coils 81 and 82 or 83 and 84, one of which will then produce an electro motive force in the circuit of the converter to be started.

The operation is as follows. Assume rectifier 77 to be operating alone and that it be desired to start rectifier 78 in parallel therewith. Let it be further assumed that the coils 14 and 81 and 82 are short circuited for the moment. Current flows alternately from the anodes 6 and 7 to the cathode 8 of the rectifier 77 which is fed from the mains 21 and 22 and supplies the load shown as a battery and the voltage consumed in the rectifier at say 30 amperes may be taken to be 20 volts. If the voltage taken by the rectifier at 30 amperes is 20 volts, the voltage taken at say 2 amperes will be somewhat higher, perhaps 22 volts and at 1 ampere perhaps 25 volts and so on. This is the well known characteristic of all vapor apparatus whether lamps or rectifiers. Now, to start the rectifier 78 which is to be put in parallel with rectifier 77 contact is made between the electrodes 9 and 8 whereon current flows from the main 21 through the resistance 46 of rectifier 78 out through the cathode lead. When the rectifier tilts back, the electrodes are separated and the current flow is established between the electrode 9 and the electrode 8 which will overcome the negative electrode starting reluctance of the electrode 8, if the break occurs in a favorable alternation. But the cathodes of the two rectifiers 77 and 78 are connected together by their leads and so are the two pairs of anodes thereof. Therefore the same voltage is impressed upon the main electrodes of both, that is, the voltage impressed between the main anodes 6 and 7 of the rectifier 78 and the cathode 8 is 20 volts. Obviously current in the rectifier 78 can not rise to a value of 15 amperes which would be its share of the total current, without having first passed one or two amperes and without having had impressed upon it the voltage necessary to support 1 or 2 amperes. But it has already been explained that the voltage necessary to support 1 ampere in the bulb 78 must be say, 25 volts; but there is only 20 volts impressed upon these electrodes. Therefore current flow in the device 78 can not start between its main electrodes. If current flow at 15 amperes could once be established in the bulb, it could theoretically continue since 20 volts would then be sufficient, but no such current value actually could become so established under the conditions assumed, in default of the full 25 volts being made available upon the rectifier 78. In the original starting of the rectifier, 77, the full supply voltage was available for establishing current flow since it was not connected in parallel with an operating rectifier which operating rectifier would have put a limit on the rectifier voltage available.

Considering now the effect of winding coils 81 and 82 on the same core, it will be seen that not only does the coil 81 increase the drop in the branch of the parallel circuit containing the rectifier 77, this rectifier being in operation, but this coil, 81, also causes an electro motive force in the coil 82 acting in such a direction as to favor the starting or increasing of current flow in the rectifier 78. This action is effective both in the starting condition and at any time when either of the rectifiers is taking less than its proper share of current.

Restoring, now, the coils 14 and the coils 81 and 82, we may assume that 15 volts is consumed therein at 30 amperes. This makes the total voltage impressed upon the rectifier 78, 35 volts (ignoring for the moment the magnetic relation between the coils 81 and 82). This voltage is more than sufficient to supply the 25 volts necessary for the momentary 1 ampere flow that must exist in 78 during starting as the current value is increasing to 15 amperes. This excess voltage required to maintain or to initiate the initial small current values in the vapor path of the rectifier while starting, which must be supplied over and above the necessary means for breaking down the negative electrode starting reluctance, I may call the transfer voltage. Its magnitude in the case assumed is only a very few volts, but, as will be evident, is all important, and furthermore exists in all rectifiers. This is entirely separate and distinct from the negative electrode starting reluctance which is overcome by the electrode 9 and which amounts to many thousand volts ordinarily. It is obvious that this rectifier, 78, might be first started and the rectifier, 77, started in parallel thereto, the same operation and the same principles being involved.

The rectifiers 79 and 80 are inter related and operate in the same way as the rectifiers 77 and 78, but are fed from the other pair of mains of the source 76. No further description is required of the operation of these rectifiers. The coils 83 and 84 serve a function similar to the function of the coils 81 and 82 in assisting in starting of the rectifier 79 or 80, for example, when the rectifiers 77 and 78 are already in operation; the coils 83 and 84 may help to maintain the proper division of current between the two branches of the system. When this division is secured the coils in the two windings, 83 and 84, or the coils 81 and 82, have the same magnetizing effect on their common core, but since their direction of influence are opposed, no magnetic induction and no mutual electromotive force will appear. If desired, the coils 81 and 82, 83 and 84 and 14 may be placed at any point in their respective branches of the parallel system.

The fundamental principle involved in the above operation depends upon the fact that the starting of a rectifier or other vapor device when connected in parallel with another operating device is by no means the same as the problem of starting this rectifier operating alone. In the latter case before the establishing of current flow, the full line voltage is available on the rectifier for getting the current transferred from the starting electrode to the main anodes. This is not the case, however, where the rectifier is starting up in parallel to another rectifier which is already operating, for the operating rectifier produces a drop in all the voltage absorbing devices in the portions of the circuit common to both rectifiers and permits across the rectifiers themselves only normal running voltage which is the lowest voltage that can be gotten on a rectifier in any of the stages of the operation.

Other sources than the polyphase source shown, as for example, a single main phase, may be used for the several rectifiers.

I claim as my invention:

1. In a system of electrical distribution the combination with a plurality of vapor electric rectifiers having the property of requiring an excess voltage to transfer current flow from starting circuits to normal operating circuits, an alternating supply and a common work circuit of means for connecting said rectifiers in parallel between said supply and said work circuit and means in one of said parallel rectifier circuits for causing current flow therein developed on the other rectifier circuit when in non-operating condition.

2. In a system of electrical distribution the combination with a plurality of vapor electric rectifiers having the property of requiring an excess voltage to transfer current flow from starting circuits to normal operation circuits, an alternating supply and a common work circuit of means for connecting said rectifiers in parallel between said supply and said work circuit and means in one of said parallel rectifier circuits for causing current flow therein developed on the other rectifier circuit when in non-operating condition, said means including separate coils included in the parallel circuits and wound upon a common core.

3. In a system of electrical distribution the combination with a plurality of vapor electric rectifiers having the property of requiring an excess voltage to transfer current flow from starting circuits to normal operating circuits, an alternating supply and a common work circuit of means for connecting said rectifiers in parallel between said supply and said work circuit and means in one of said parallel rectifier circuits for causing current flow therein developed on the other rectifier circuit when in non-operating condition, in further combination with sustaining coils in each of the parallel rectifier circuits.

4. In a system of electrical distribution the combination with a polyphase source, a plurality of vapor electric rectifiers requiring an excess voltage for transferring current from starting circuits to the main operating circuit, means for connecting rectifiers in groups in several phases in the polyphase source, means for passing all rectified current to an intermediate point of the source, means located in each of the circuits of the parallel rectifiers for building up the requisite transfer voltage on any non-operating rectifiers of this system and for controlling the distribution of currents between operating rectifiers.

5. In a system of electrical distribution, the combination with a plurality of vapor electric devices, each including a completely exhausted container and suitable electrodes, one of which is a vaporizable reconstructing cathode, of a plurality of alternating supply mains carrying voltages of different phases, connections for obtaining rectified current from each of the supply mains through one of said devices, together with positive means for securing parallel operations of said rectified currents, consisting of voltage absorbing and voltage interchanging means traversed by rectified current of the several devices.

Signed at New York, in the county of New York, and State of New York, this 13th day of June A. D. 1907.

PERCY H. THOMAS.

Witnesses:
Wm. H. Capel,
Thos. H. Brown.